United States Patent [19]
Biasi

[11] 3,715,868
[45] Feb. 13, 1973

[54] APPARATUS FOR POLLUTION CONTORL OF FURNACE GASES

[76] Inventor: Charles P. Biasi, 74 Braman Road, Waterford, Conn. 06385

[22] Filed: Nov. 23, 1970

[21] Appl. No.: 91,763

[52] U.S. Cl. .....................55/315, 55/432, 55/474, 55/512, 210/268, 210/270, 210/290
[51] Int. Cl. ..........................................B01d 23/16
[58] Field of Search....55/98, 99, 474, 432, 512, 315; 210/268, 270, 274, 285, 288, 290; 263/196; 165/107; 209/490, 491, 493, 494, 495

[56] References Cited

UNITED STATES PATENTS

| | | | |
|---|---|---|---|
| 793,745 | 7/1905 | Shields | 55/474 |
| 1,766,221 | 1/1930 | Lynch | 55/474 |
| 2,780,310 | 2/1957 | Schaub | 210/268 |
| 2,901,148 | 8/1959 | Cunningham et al. | 222/185 |

*Primary Examiner*—Bernard Nozick
*Attorney*—Colton and Stone

[57] ABSTRACT

A filter device is disclosed for removing of particulate material and reactive vapors from the exhaust gases from a furnace or the like. The device comprises a flow velocity reduction chamber for separating particles above a predetermined size. Particulate filter material is used to remove smaller particles from the exhaust stream. Chemicals may be added to the filter device, either into the chamber or into the particulate filter material. Means are provided for removing fouled particulate filter material.

10 Claims, 5 Drawing Figures

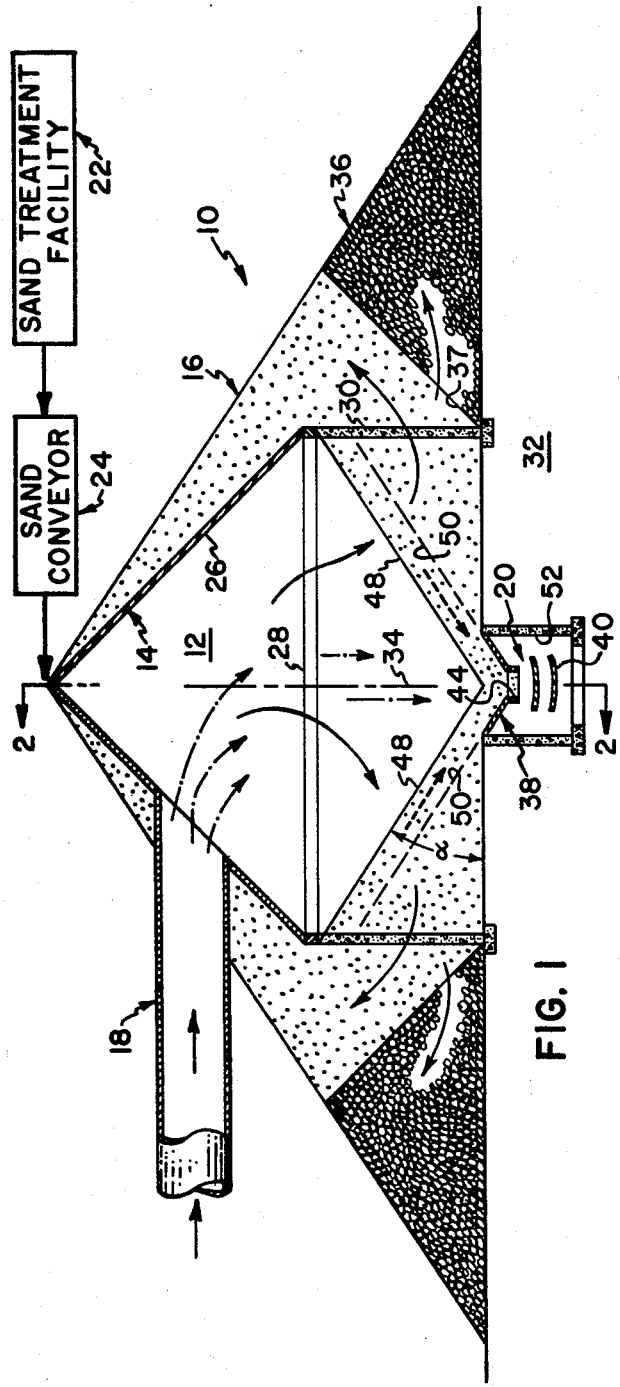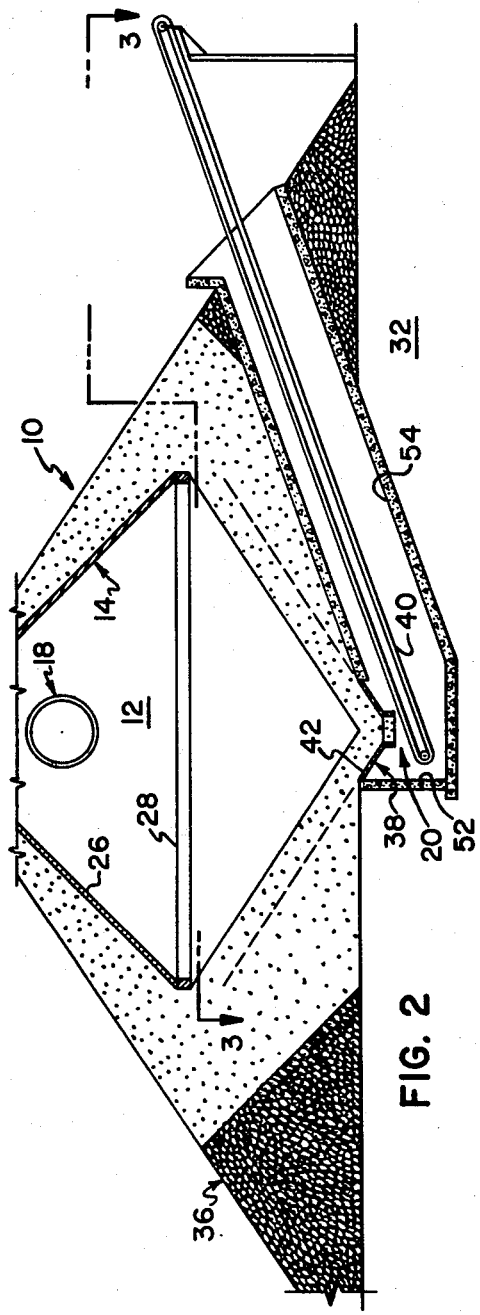

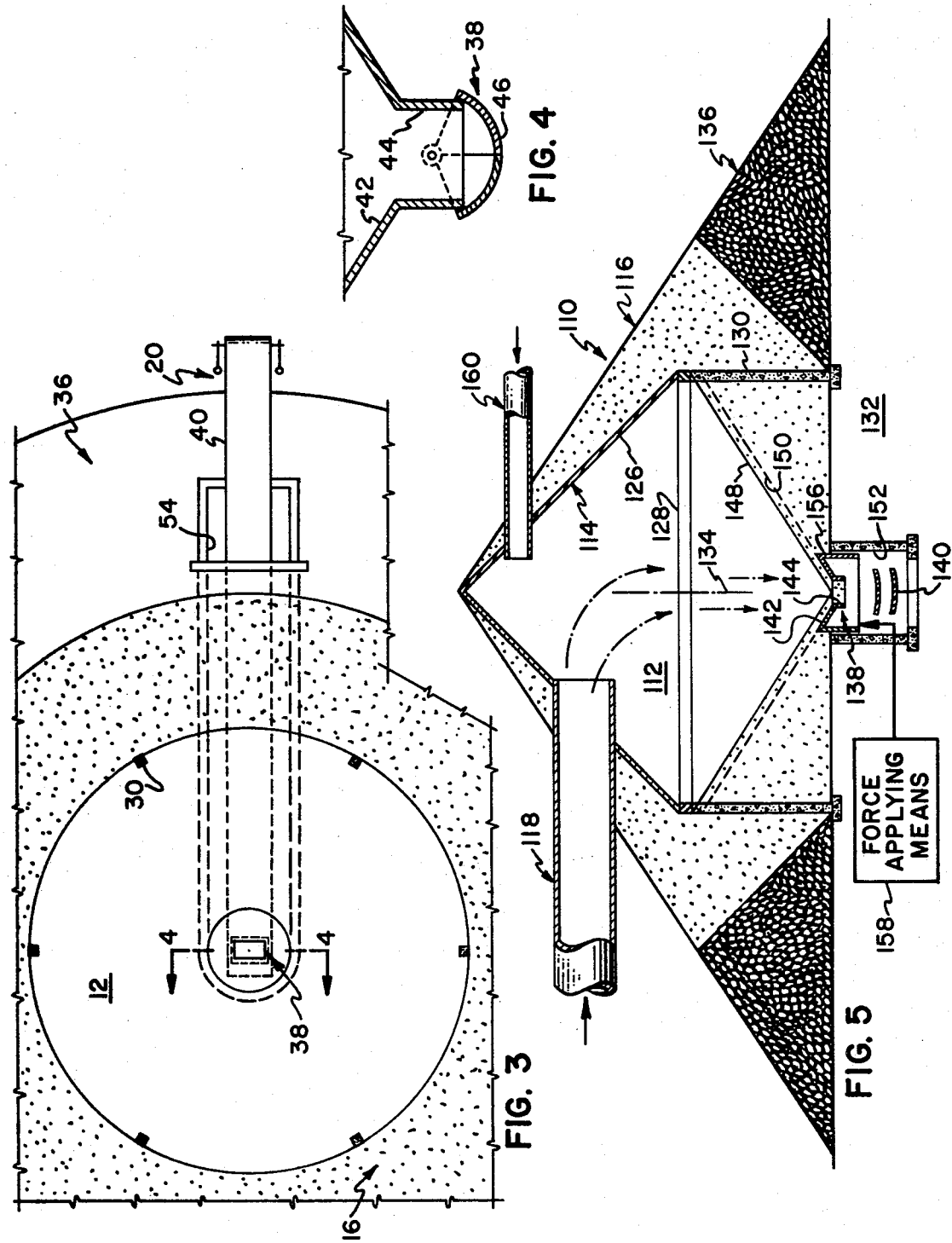

APPARATUS FOR POLLUTION CONTORL OF FURNACE GASES

BACKGROUND OF THE INVENTION

The presently used devices for removing particulate material from furnace gases comprise a scrubber for spraying water through the gas. The scrubber removes most of the particulates and reduces the temperature of the gases for introduction into an electrostatic precipitator. Although this arrangement satisfactorily removes particulates, severe problems occur in removing collected materials from the precipitator and then disposing of the scrub water.

The acquisition and disposal of scrub water is acute. Unless the scrub water is treated and reused, the volume of scrub water required is substantial generating high water bills and causing severe problems of water pollution. In addition, there is a problem of acidic or alkaline scrub water corroding or fouling the scrubber.

Proposals exist in the prior art for using particulate material filters to remove contaminants from exhaust gases. Exemplary are the disclosures in U.S. Pat. Nos. 793,745; 3,296,775; 3,505,008; and 3,410,055. The most pertinent reference with respect to this invention is that of U.S. Pat. No. 793,745. In this disclosure, the particulate filter material is removed more or less evenly from the entire filter bed. As will become more apparent hereinafter, the device of this invention removes substantially only that filter material which becomes fouled most readily thereby minimizing the amount of filter material that must be handled.

SUMMARY OF THE INVENTION

It is an object of this invention to provide an apparatus for pollution control of furnace gases utilizing particulate filter material.

Another object of the invention is to provide a pollution control device for removing particulates and reactive vapors from exhaust streams using a bed of particulate filter material including means for removing and replenishing that portion of the filter bed which becomes fouled the quickest.

Another object of the invention is to provide an apparatus for removing particulates and reactive material from exhaust streams using a bed of particulate filter material having exit means which may be adjusted to vary the quantity of material removed from the filter bed.

BRIEF DESCRIPTION OF THE DRAWINGS

FIG. 1 is a cross sectional view of an apparatus for pollution control of furnace gases constructed in accordance with this invention;

FIG. 2 is a cross sectional view of the device of FIG. 1 taken substantially along line 2—2 thereof as viewed in the direction indicated by the arrows;

FIG. 3 is a partial cross sectional view of the device of FIG. 2 taken substantially along line 3—3 thereof as viewed in the direction indicated by the arrows;

FIG. 4 is an enlarged cross sectional view of FIG. 3, taken substantially along line 4—4 thereof as viewed in the direction indicated by the arrows; and FIG. 5 is a cross sectional view, similar to FIG. 1, of another embodiment of this invention.

DETAILED DESCRIPTION OF THE PREFERRED EMBODIMENTS

Referring to FIGS. 1 and 2, there is shown a filter device 10 in accordance with this invention comprising as major components a flow velocity reduction chamber 12 provided by a roof 14 and a bed of particulate filter material 16, means 18 for introducing particulate laden gas into the chamber 12, means 20 for removing fouled filter material, a filter material treatment facility 22 and means 24 for conveying clean filter material back to the device 10.

The roof 14 defines the top of the chamber 12 and comprises a conical cap 26 supported by an annular ring 28 which is in turn supported by a plurality of columns 30. The columns 30 elevate the cap 26 above an underlying ground surface or foundation 32. For purposes more fully explained hereinafter, the cap 26 is preferably steeper than the angle of repose of the filter material 16. Since the cap 26 is conical, the overall shape of the filter device 10 is likewise conical although it should be understood that other convenient shapes, for example square and rectangular, are suitable for the device 10.

The filter material 16 may be of any suitable type such as sand. The filter material 16 has a predetermined angle of repose as shown in FIG. 1. The height of the ring 28 and the width of the chamber 12 are preferably correlated so that the filter material 16 flowing under the roof 14 from opposite sides thereof substantially meets in the bottom of the chamber 12. It will accordingly be seen that the chamber 12 is defined by the upwardly converging sides of the roof 14 and the downwardly converging sides of the filter material 16.

The overall plan of operation of the filter device 10 should now be apparent. Fresh sand 16 is transported by the conveyor 24 to adjacent the apex of the cap 26 and then dumped thereon. Since the cap 26 is steeper than the angle of repose of the sand 16, the sand 16 flows downwardly and away from a central vertical axis 34 passing through the chamber 12. As the sand 16 moves off the roof 14, it flows downwardly and toward the central axis 34 into the configuration shown in FIGS. 1 and 2. After a substantial amount of particulate laden gas passes through the chamber 12 and then through the sand 16, part of the sand 16 is withdrawn through the removing means 20 for reconditioning at the treatment facility 22.

Supporting the outer edge of the sand body 16 is a levee 36 which may be made of any suitable material but which is illustrated as made of gravel. The gravel levee 36 provides an additional outlet for gas passing through the device 10 and can normally be constructed at minimum cost. The levee 36 has an interior edge 37 presenting a steeper angle than the angle of repose $\alpha$ of the sand 16 to direct sand movement toward the central axis 34.

An important part of this invention resides in the sand removing means 20. The removing means 20 comprises gate means 38 for periodically removing part of the sand 16 from adjacent the sides of the chamber 12 and conveyor means 40 for transporting the sand 16 removed from the device 10 to the treatment facility 22. As shown best in FIGS. 1, 2 and 4, the gate means 38 comprises downwardly converging sides 42 providing an opening 44 at the lowest point thereof. A clamshell 46 or other suitable gate is provided to close the opening 46 and suitable power means (not shown) are provided to manipulate the clamshell 46 either manually or in response to operating conditions of the device 10, such as the pressure existing in the chamber 12.

As seen most clearly in FIG. 1, the opening of the gate means 38 causes movement of the sand 16 downwardly through the opening 44 followed by movement of sand along a path indicated by the dashed arrow. It will be apparent that the opening of the gate means 38 removes the support for sand residing between the sides 48 of the chamber 12 and an imaginery line 50 parallel thereto. It will accordingly be seen that the means 20 removes the particulate filter material 16 substantially only from the sides of the chamber 12. Since the filter material 16 in this region is that which becomes fouled the quickest, it will be apparent that the only sand actually being removed is that which actually carries a substantial amount of particulates.

The clamshell 46 is closed, either upon command or automatically in response to operational parameters such as the pressure in the chamber 12 or the mass of sand removed therefrom. When the clamshell 46 is closed, movement of the sand 16 continues for a short period to restore the size of the chamber 12 as shown in FIG. 1. It will accordingly be seen that the gate means 38 is disposed below the convergence of the chamber sides 48 and defines a path of particulate filter movement parallel to the converging sides 48 of the chamber 12.

The gate means 48 and the conveyor 40 may be housed in any suitable manner. In FIGS. 1-3, the gate means 38 is illustrated as positioned in a concrete well 52 having an upwardly inclined tunnel 54 extending therefrom to house the conveyor 40.

The filter device 10 employs two filtering mechanisms to remove particulates from the incoming gas stream. As is apparent from FIGS. 1 and 2, the flow area of the chamber 12 substantially exceeds that of the gas introducing means 18 so that the flow velocity in the chamber 12 is substantially less than that in the introducing means 18. Consequently, particles above a predetermined size, which are supported by the gas velocity existing in the introducing means 18, are not supported by the lower gas velocity in the chamber 12 whereupon the particles fall out of suspension. As shown by the dash-dot arrows in FIG. 1, the gas introducing means 18 defines a flow path for particles above the predetermined size passing downwardly into the convergence of the chamber sides 48. Consequently, substantially all of the particles above this size accumulate in the convergence of the chamber sides 48.

The second filtering mechanism operative in the device 10 is a screening effect of the smaller particles passing through the sand grains 16. Since sand is an efficient filter material, most of the smaller particulates come to rest in sand 16 between the chamber side 48 and the imaginary line 50.

Referring now to FIG. 5, there is shown another embodiment of this invention illustrated as a filter device 110. For purposes of brevity, analogous reference characters are used on features common to the embodiment of FIGS. 1-4 with only the differences being specifically discussed.

There are two different features provided by the filter device 110 which are not shown in FIGS. 1-4. The gate means 138 is movable vertically in the well 152 and includes flanges 156 extending thereinto and means (not shown) sealing the space between the well 152 and the flanges 156. A force applying means 158, such as a hydraulic cylinder, is provided to raise and lower the gate means 138. As will be apparent to those skilled in the art raising the gate means 138 decreases the quantity of the sand 116 which is removed when the opening 144 is unobstructed, as by opening the clamshell (not shown).

This feature presents several important advantages. It will be immediately apparent that the gate means 138 may be elevated so that the converging sides 142 are coplanar with the chamber sides 148. When the clamshell is open under these circumstances the only material passing through the opening 144 are particulates dropped out of the gas stream which fall into the convergence of the chamber sides 148.

In addition to removing only the particulates accumulating in the convergence of the chamber sides 148, the gate means 138 may be lowered sequentially to remove decreasingly polluted segments of sand 116 from adjacent the chamber sides of 148. In this regard, the discharge material may be analyzed to determine when the gate means 138 has reached the elevation of the slope of clean sand, which would be the point at which the discharge of sand would be stopped and the gate means 138 raised to the elevation where only fly ash could be discharged.

The remaining feature of this invention resides in means for chemically reacting gaseous pollutants introduced through the conduit means 118 into a solid material which can be filtered by the sand 116. Toward this end, there is provided means 160 for introducing a chemically reactive material. The most common gaseous pollutant in the stack gases is sulphur dioxide. It is known in the art of scrubbing gases to use the chemical reaction between sulphur dioxide and lime or magnesia to produce calcium or magnesium sulphates. In this invention, limestone or dolomite is comminuted to produce particles sufficiently small so as not to fall out of suspension, because of velocity reduction, when introduced into the chamber 112. The crushed limestone or dolomite is injected into the conduit means 160 and into the chamber 112. The sand 116 adjacent the chamber sides 148 separates the crushed limestone or dolomite. The stack gases are introduced through the conduit means 118, the larger particles fall out into the convergence of the chamber sides 148, the smaller particles accumulate in the sand 116 and the sulphur dioxide is reacted by the crushed limestone or dolomite accumulated by the sand 116 to form calcium or magnesium sulphates.

An alternate arrangement for chemically reacting gaseous pollutants introduced through the conduit means 18, 118 into a solid material which can be filtered by the sand 16, 116 may be provided by disbursing a reactive material in the sand. Thus the filter material may comprise intermixed sand and crushed limestone so that the limestone particles will chemically react the sulphur dioxide to form calcium sulphate which is filtered by the sand.

It will accordingly be seen that there is herein provided an improved apparatus for pollution control of furnace gases.

I claim:

1. A filter device comprising means defining a chamber including an elevated roof and means supporting granular filter material exhibiting a predetermined angle of repose providing converging lower side walls defined by the surface of the filter material which are downwardly inclined in accordance with the angle of repose;

means defining a gas flow path into the chamber and then through the filter material including means connected to the first mentioned means for introducing particulate laden gas into the chamber; and means for removing filter material from the lower side walls and providing a relatively stationary zone of filter material surrounding the lower side walls including means for removing filter material substantially only from the converging lower side walls of the filter material and comprising outlet means disposed at the convergence of the lower side walls defining a passage for filter material.

2. The filter device of claim 1 further comprising means for gravitationally replenishing the filter material adjacent the chamber wherein the roof comprises upwardly converging sides defining a steeper angle than the angle of repose and means for delivering filter material to the top of the roof.

3. The filter device of claim 2 wherein the chamber defined by the upwardly converging roof sides and the downwardly converging lower side walls is a large flow area compared to the flow area of the gas introducing means, the chamber comprising a flow velocity reduction area for separating particles from the gas above a predetermined size.

4. The filter device of claim 3 wherein the gas introducing means comprises means defining a flow path for particles above the predetermined size including a segment passing downwardly toward the convergence of the chamber side walls.

5. The filter device of claim 1 wherein the last mentioned means comprise gate means disposed adjacent the convergence of the filter material defining a path of filter material removal parallel to the converging lower side walls of the filter material.

6. The filter device of claim 5 wherein the outlet means comprises downwardly inclined convergent sides providing an opening at the lower end thereof and means for selectively closing the opening.

7. The filter device of claim 6 further comprising means for raising and lowering the outlet means for altering the distance between the outlet sides and the chamber side walls for altering the quantity of material removed from the device.

8. The filter device of claim 5 further comprising means for raising and lowering the gate means within the particulate material for altering the quantity of material removed from the device.

9. A filter device comprising means defining a chamber including a roof and means supporting granular filter material exhibiting a predetermined angle of repose providing a flow velocity reduction chamber for separating particles from a gas above a predetermined size, the chamber having a top defined by the roof and converging lower side walls, defined by the filter material, downwardly inclined in accordance with the angle of repose;

means defining a gas flow path into the chamber and then through the filter material including means connected to the chamber for introducing particular laden gas into the chamber, the gas introducing means having a smaller flow area than the chamber and defining a path of uninterrupted falling movement for the particles above the predetermined size generally downwardly into the convergence of the lower side walls; and means for removing particles accumulating in the convergence of the lower side walls comprising gate means disposed at the chamber convergence 10. The filter device of claim 9 wherein the two last mentioned means comprise gate means disposed adjacent the convergence of the sides defining a path of downward particle movement and a path of particulate filter material movement generally parallel to the converging sides and means for raising and lowering the gate means.

* * * * *